Sept. 1, 1925.                                                           1,552,143
J. H. GRAY
MELTING LOW VOLATILE METALS AND SMELTING ORES THEREOF
Filed June 18, 1921                         2 Sheets-Sheet 1

INVENTOR
James H. Gray
BY
D. Anthony Usina
ATTORNEY

Sept. 1, 1925.
J. H. GRAY
1,552,143
MELTING LOW VOLATILE METALS AND SMELTING ORES THEREOF
Filed June 18, 1921 2 Sheets-Sheet 2
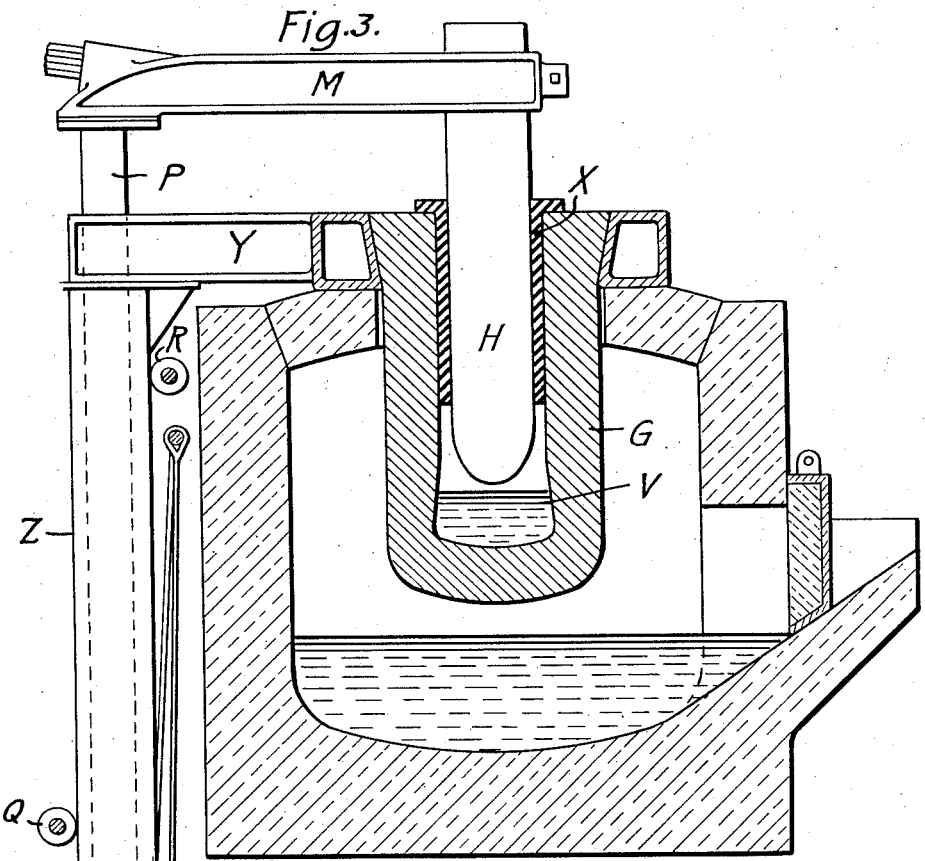
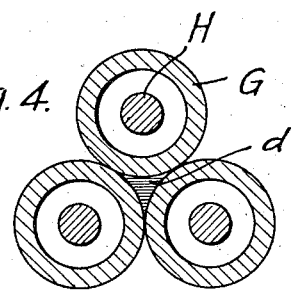
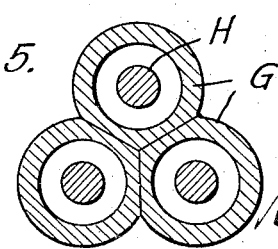
INVENTOR
James H. Gray
ATTORNEY Patented Sept. 1, 1925.

1,552,143

UNITED STATES PATENT OFFICE.

JAMES H. GRAY, OF NEW YORK, N. Y.

MELTING LOW VOLATILE METALS AND SMELTING ORES THEREOF.

Application filed June 18, 1921. Serial No. 478,616.

*To all whom it may concern:*

Be it known that I, JAMES H. GRAY, a citizen of the United States, residing in the city, county, and State of New York, have invented certain new and useful Improvements in Melting Low Volatile Metals and Smelting Ores Thereof, of which the following is a specification.

My invention aims to provide a furnace and a method designed particularly for smelting ores of low volatile metals or for the melting of such metals, though adapted also for other uses. The invention may be applied for example to the smelting of tin ore or for the melting of tin or brass or zinc.

In certain prior applications for Patent No. 404,727, filed August 20th, 1920, and No. 445,620, filed February 17th, 1921, I have illustrated a method of performing such operations which involves the use of an electrode passing up through the hearth of the furnace with the charge arranged in a trough surrounding such electrode. The present invention is an improvement by which there are no electrodes passing through the metal, so that the latter may be bowl shaped instead of annular, thus permitting the use of a smaller furnace which is more economical to build and which is also more economical to operate because of its smaller total radiating surface.

The accompanying drawings illustrate apparatus designed in accordance with the invention.

Fig. 3 is a similar section of a complete furnace of alternative design;

Figs. 4 and 5 are horizontal sections illustrating arrangements of electrodes for using a three-phase current.

Referring to the apparatus illustrated a bowl-shaped furnace or crucible comprises the usual hearth A, side walls B and dome-shaped roof C; the furnace being arranged to tilt by a trunnion D and to empty the molten metal through a spout E which is adapted to be closed by a door F.

The heat is produced by means of an arc struck between a hollow electrode G and a smaller electrode H within the first one. The bath J or charge of metal or ore is shielded from direct radiation of heat from the arc by providing a closed end K on the hollow electrode. According to Figs. 1 and 2 the hollow electrode is supported directly from the roof, the opening around the electrode being protected by an annular cooling ring L of metal through which water is circulated. The inner electrode H is supported from a cross-arm M clamped on it in the usual way. To save loss of heat a top N is mounted on the outer electrode with the opening for the passage of the inner electrode and with a cooling ring O surrounding the inner electrode above such opening. For the purpose of adjusting the upper electrode the arm M is mounted on a post P extending down along the back of the furnace, guided by rollers Q and R and adapted to be raised and lowered by means of a cable S fixed at one end to the furnace and passing over a pulley T on the lower end of the post and thence to a winch or any usual or suitable hoisting apparatus.

The electrodes are cylindrical. The heat of the arc will pass through the carbon of the outer electrode, which is designed of such dimensions as to radiate sufficient heat from its outer surface to the charge as will melt the metal without volatilizing it or any of its constituents.

Figure 1:
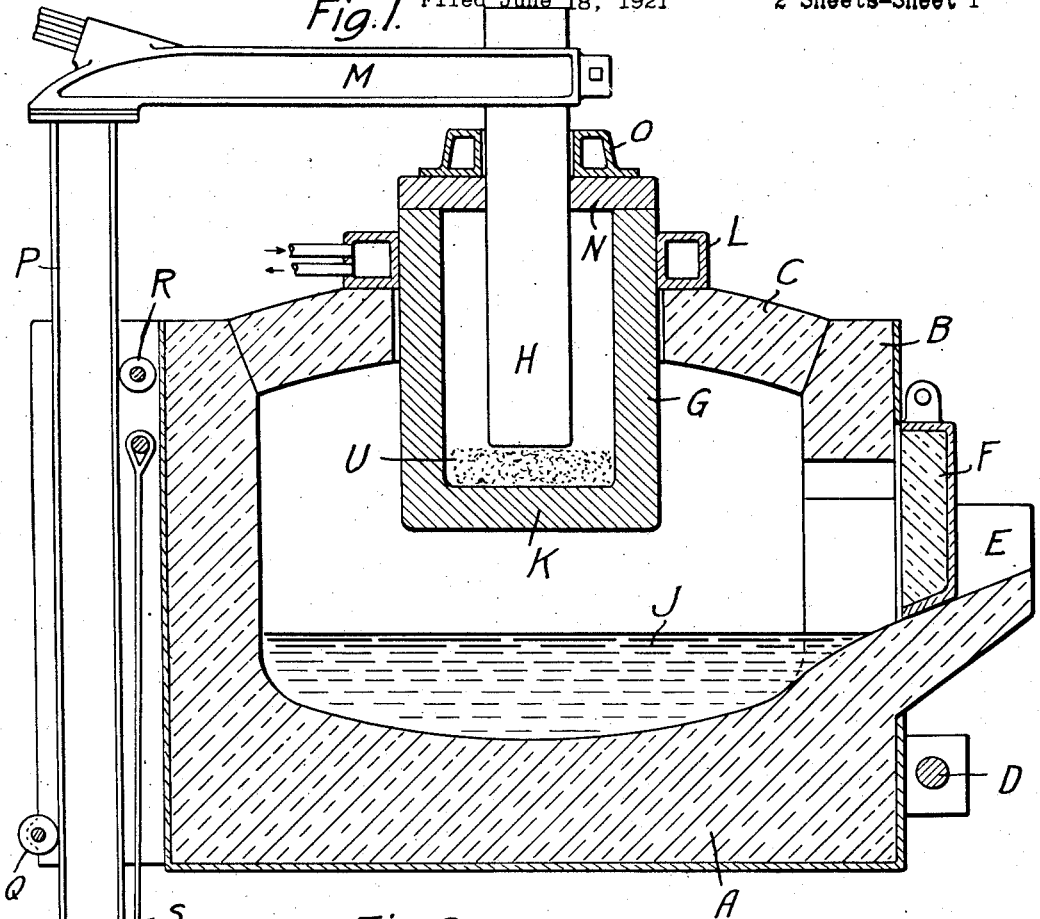
Fig. 1 is a longitudinal section of a complete furnace.

The arc may be struck directly from one electrode to the other. But in order to avoid or limit the wear of the hollow electrode I place in the bottom of it a material which can be easily renewed, such for example, as the layer U of pieces of coke or broken electrodes, as shown in Fig. 1.

Figure 2:
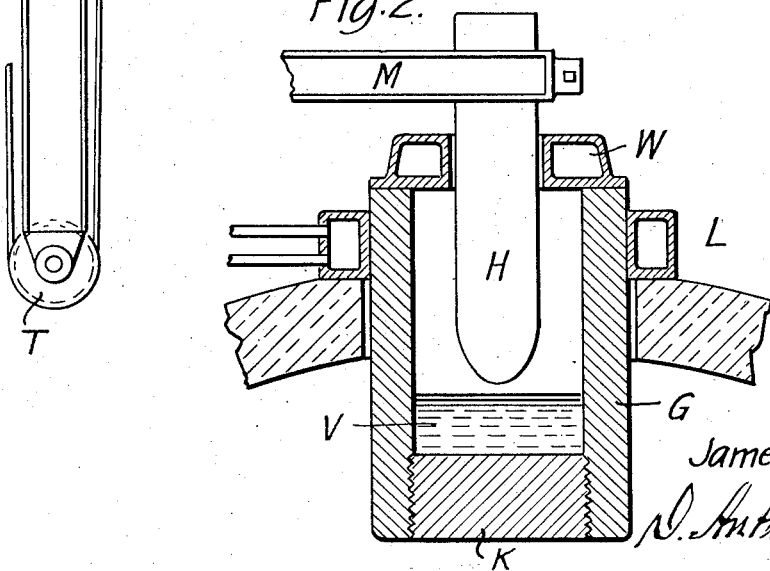
Fig. 2 is a detail of an alternative scheme and also in longitudinal section.

Or, as in Fig. 2, I may provide a layer or bath V of molten pig iron overlaid with a slag of such materials as lime and silica which are easily renewable as they may be volatilized, leaving the pig iron as a conductor between the arc and the outer electrode. With the provision of such a supplementary body of conducting material in the tubular electrode, it will be fairly permanent. The inner electrode will wear away, but may be easily maintained by the addition of a section thereto at the upper end as it is fed down to compensate for wear, as in ordinary electrode furnaces.

A cover N of brick or other suitable material may be placed on top of the hollow electrode as above described in order to prevent excessive loss of heat at that point, but it will be possible to work without such a cover because of the location of the arc below the inner electrode and the consequent partial confinement of the heat to this point. Fig. 2 shows a water cooled cover W without a brick support.

The relative diameters of the electrodes may be such as to bring the inner one close to the wall of the outer one, in which case an insulating sleeve X (Fig. 3) may be placed between them except near the bottom. But when a low voltage is used and a considerable space is provided around the inner electrode, no such insulating medium is necessary.

The hollow electrode may be fixed in position, as in Figs. 1 and 2. For some purposes, however, it is advantageous to make it movable, as in Fig. 3, where it is suspended from an arm Y mounted on a hollow post Z which in turn serves as a guide for the post P which carries the inner electrode. The post P is operated by a cable S passing over the pulley T at its lower projecting end, and the hollow post Z is elevated by means of a cable $a$ passing over a pulley $b$ mounted on the side of the post.

This adjustability of both electrodes is advantageous in treating a charge which during the operation settles to a lower level. For example, scrap metal may be charged into the furnace to the level indicated by the letter $c$ and the electrodes elevated to a point above this level before turning on the current. As the scrap melts its level falls and the electrodes may be brought downward to keep them close to the charge without making electrical contact with it. With this mode of operation the transfer of heat from the hollow electrode to the bath is very rapid and efficient, as only a small proportion of the heat going to the bath comes from radiation from the walls of the furnace.

Tubular electrodes open at both ends are a commercial product. I propose to close the end of such a tube by making the bottom K in the form of a screw plug, as indicated in Fig. 2, though it may be molded integrally as indicated in the other figures. We may start with a hollow electrode of somewhat more than the necessary length and with a plug screwed into the lower end; and after the lower portion of the electrode is destroyed by use it may be inverted, with a plug screwed into the other end and the used end squared off. The electrodes will generally have square corners as in Fig. 1 when they are new, but will soon oxidize and wear as indicated progressively in Figs. 2 and 3.

The furnace which I have described is designed to melt one thousand pounds of brass. Such a charge can be melted and brought to casting temperature in approximately one hour and a quarter.

The electric arc has a temperature of approximately 3600° C. but when the arc is struck in a cavity such as I have shown, heat may be dissipated in the cavity and in the material, such as broken carbon, or a metallic bath, which I have described, so that the temperature may be reduced to, for instance, 2900° C. If the outer electrode has a diameter of say twenty-four inches, with walls four inches thick, the conductivity of the carbon is such that the heat may be conveyed through the outer electrode at a rate which will maintain 1300° C. in the space above the metal, at the same time utilizing heat equivalent to 92 K. W. in the furnace. The loss of heat through the roof, due to conduction through the electrodes, is not over 6% of the total, and the efficiency of the furnace is between 65% and 75%.

If the smaller electrode be composed of graphite and the outer electrode of amorphous carbon, and the inner electrode be eight inches in diameter, then the current carrying capacity of the graphite electrode end of the tubular amorphous carbon electrode will be the same. The proportioning of the electrodes will determine the drop in temperature between the arc and the cavity in the outer electrode, and also the drop in temperature between the cavity and the melting chamber of the furnace.

In Fig. 4 I have shown an arrangement for a three-phase furnace with the three hollow electrodes touching at their circumference and the space between them filled with a body $d$ of paste or composition of carbon. In Fig. 5 the hollow electrodes G are cut with flat faces on the outside so that they fit close together with these faces arranged at angles of 120 degrees. In both cases the three inner electrodes are connected to the wires of the three-phase system. But no connection is necessary between the hollow electrodes and the electric system because these electrodes are in contact with one another and form the neutral line of the three-phase system.

The same principle may be applied for single phase currents or, in fact, for currents of any number of phases, and the current may be distributed in any one of numerous known ways. Instead of having two of the hollow electrodes in direct contact with each other in the manner shown in Figs. 4 and 5, they may be spaced apart from each other with electrical connections. Or the parts or groups of electrodes described may be duplicated or multiplied to any desired extent for furnaces of larger size or of different shape, so that single phase current may be used in parallel branches through the several groups or two or three phase current may be passed in several branches one through each pair or group of electrodes. In fact, a great variety of arrangements of the electrodes and circuits may be used by those familiar with this class of electrical arrangement.

Though I have described with great particularity of detail certain embodiments of my invention, yet it is not to be understood therefrom that the invention is restricted to the particular embodiments disclosed. Various modifications thereof in the details and arrangement of the apparatus and in the steps of the process may be made by those skilled in the art without departure from the invention as defined in the following claims.

What I claim is:

1. The method of providing heat for melting low volatile metals which comprises holding electrodes above the charge and maintaining an arc between them and shielding the charge from the arc.

2. The method of providing heat for melting low volatile metals which comprises holding all the electrodes above the charge, with a part of one of the electrodes between the charge and an arc which is maintained from the end of the other electrode.

3. The method of providing heat for melting low volatile metals and for similar purposes which comprises holding above the charge a hollow electrode and a smaller electrode within the first and maintaining an arc between them.

4. The method of providing heat for melting low volatile metals and for similar purposes which comprises holding above the charge a hollow electrode with a closed bottom and a second electrode extending into the hollow one and maintaining an arc between them.

5. The method of providing heat for melting low volatile metals and for similar purposes which comprises holding above the charge a hollow electrode with a closed bottom and a body of conducting material on said bottom and a second electrode within the hollow one, and maintaining an arc between the second electrode and the said body of contacting material.

6. An apparatus for melting low volatile metals and for similar purposes comprising a hearth for the charge and a pair of electrodes suspended above the charge, one being hollow and one being located within the first, and means for maintaining an arc between them, said hollow electrode having a closed bottom for holding a liquid contacting material.

7. An apparatus for melting low volatile metals and for similar purposes comprising a hearth for the charge and a pair of electrodes suspended above the charge, one being hollow and one being located within the first, and means for maintaining an arc between them, said hollow electrode having a closed bottom and carrying a layer of molten contacting material on the bottom.

8. An apparatus for melting low volatile metals and for similar purposes comprising a hearth for the charge, a pair of electrodes above the charge, means for maintaining an arc between them, and means carried by one of the electrodes for shielding the charge from direct radiation of heat from the arc, both said electrodes being adjustable toward and from the charge.

9. An apparatus for melting low volatile metals and for similar purposes comprising a hearth for the charge and three sets of electrodes suspended above the charge, each set comprising a hollow electrode and a smaller electrode entering the same, the three smaller electrodes being adapted for connection with the wires of three-phase electric system so as to maintain three separate arcs within the hollow electrodes.

In witness whereof, I have hereunto signed my name.

JAMES H. GRAY.